UNITED STATES PATENT OFFICE.

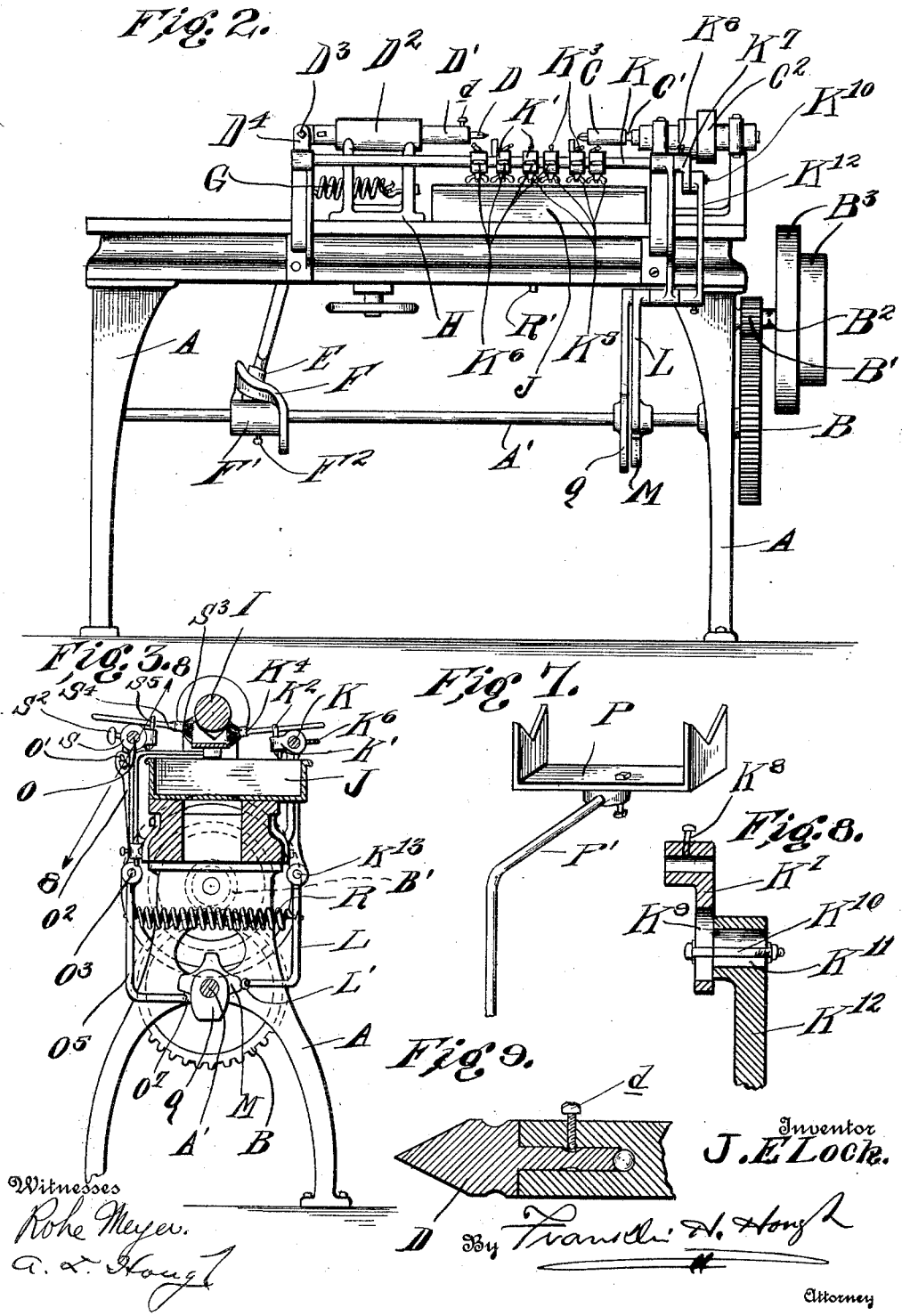

JOHN EDWARD LOCK, OF SHERBROOKE, QUEBEC, CANADA.

APPARATUS FOR PAINTING SPOOLS.

1,076,773.   Specification of Letters Patent.   Patented Oct. 28, 1913.

Application filed September 12, 1912. Serial No. 720,054.

*To all whom it may concern:*

Be it known that I, JOHN E. LOCK, a subject of the King of England, residing at Sherbrooke, in the Province of Quebec and Dominion of Canada, have invented certain new and useful Improvements in Apparatus for Painting Spools; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in an apparatus for shellacking and painting spools such as are used in cotton mills, it being essential that the surface of the spool be exceedingly smooth to prevent the breaking of the yarn while being wound thereon, the surface of the spool also being preferably painted in different colors for distinguishing the yarns of different sizes.

The invention comprises various details of construction and combinations and arrangements of parts which will be hereinafter fully described and then specifically defined in the appended claims.

Figure 1:
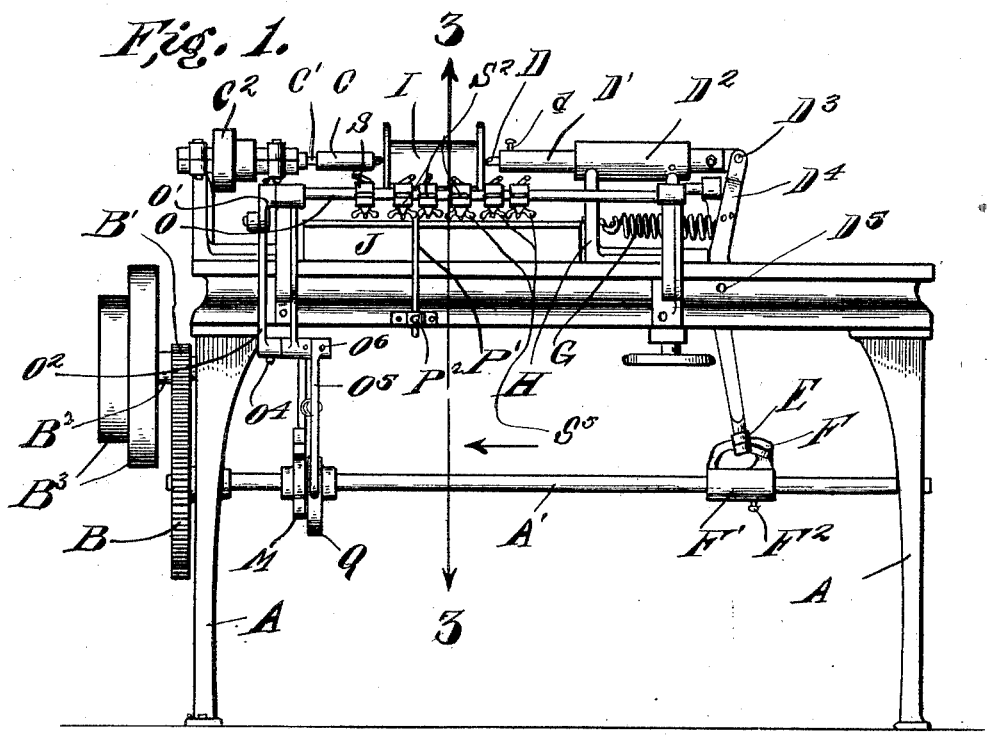
Figure 4:
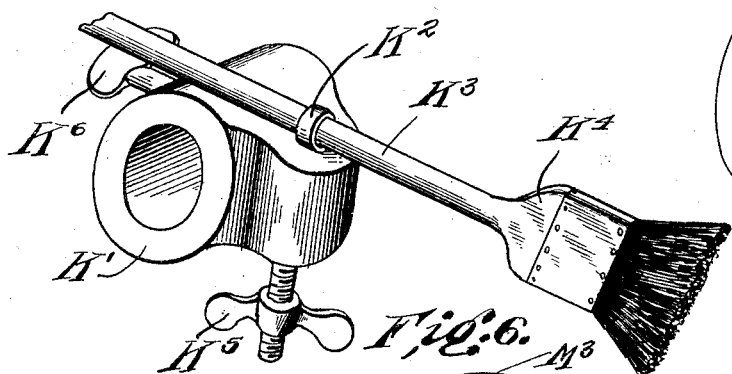
Figure 5:
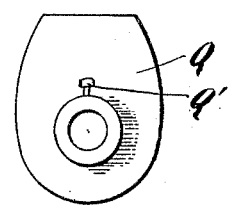
Figure 6:
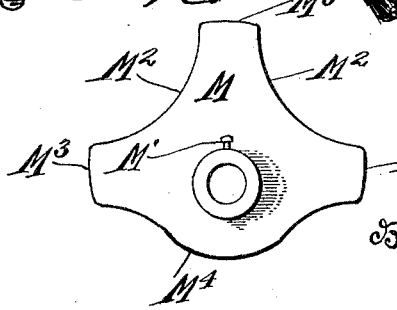

I illustrate my invention in the accompanying drawings, in which:

Figure 1 is a side elevation of the apparatus. Fig. 2 is a similar view of the reverse side of the machine. Fig. 3 is a sectional view on line 3—3 of Fig. 1 looking in the direction of the arrow. Fig. 4 is a detail perspective view of a brush and holder therefor. Fig. 5 is a detail view of a cam. Fig. 6 is a detail view of a different form of cam. Fig. 7 is a detail perspective view of a spool holder. Fig. 8 is a sectional view on line 8—8 of Fig. 3. Fig. 9 is a sectional view through one of the spindles carrying one of the spools.

Reference now being had to the details of the drawings by letter, A designates the frame of the machine, which has a driving shaft $A'$ journaled therein with a gear wheel B at one end which meshes with a pinion $B'$, which is fixed to the driving shaft $B^2$, having pulleys $B^3$ thereon and to which power is applied.

C designates a four-cornered center for engagement with one end of the spool and is mounted upon a rotatable shaft $C'$ journaled in suitable bearings and driven by a pulley $C^2$, and D designates a swiveled ball bearing tail stock, shown in section in Fig. 9 of the drawings. The spindle D is connected to the holder $D'$ by means of a set screw $d$, shown in Fig. 9 of the drawings, which has a longitudinal movement within the shell $D^2$. Said holder is connected at $D^3$ by a pivotal pin with the upper end of the angle lever $D^4$, which is pivotally mounted upon a pin $D^5$ carried by the frame of the apparatus. The lower end of the lever $D^4$ has an anti-friction roller E journaled thereon which is adapted to contact with the cam edge F upon the collar $F'$, which latter is fastened by means of a set screw $F^2$ upon a shaft $A'$. A coil spring G is fastened at one end to the carriage H, adjustably held upon the frame, and which supports the shell $D^2$, and its other end is fastened to the lever $D^4$ and serves to return the latter to its normal position after the same has been oscillated by the cam upon the collar $F'$.

The spool is designated by the letter I, and is adapted to be mounted upon spindles D and C respectively and to be rotated by the latter. The spool is temporarily held by means of a rack P, a detail of which is shown in Fig. 7 of the drawings, and which rack is mounted upon a bracket $P'$, held in a socket $P^2$ attached to the frame and shown in Fig. 1 of the drawings.

Mounted in suitable bearings upon the frame of the apparatus is a rock shaft K, and fixed to said rock shaft is a series of collars $K'$, one of which is shown in Fig. 4 of the drawings, and each is provided with an eye bolt $K^2$ passing through an aperture in the collar and adapted to hold the handle $K^3$ of a brush $K^4$, the said bolt $K^2$ being held upon the collar by means of a winged nut $K^5$. A suitable set screw $K^6$ serves as a means for holding the collar in an adjusted position.

Referring to Fig. 2 of the drawing, it will be noted that the shaft K has a crank $K^7$ fastened thereto by means of a set screw $K^8$, a sectional view of said crank being shown in Fig. 8 of the drawings, and which is provided with an elongated slot $K^9$ for the reception of an adjusting bolt $K^{10}$, which passes through an elongated slot $K^{11}$ formed in the crank arm $K^{12}$, the latter being fastened to a stub shaft $K^{13}$, shown in section in Fig. 3 of the drawings, and which is mounted in suitable bearings upon the frame of the apparatus. An angled arm L is fastened to the crank shaft $K^{13}$, and has an anti-friction wheel L' journaled at one end which is adapted to contact with the cam M, a detail view of which is shown in Fig. 6 of the drawings, and which is held by means of a set screw M' upon the shaft A'. Said cam M, it will be noted, has scalloped portions $M^2$ and projections $M^3$ as well as an undulated edge $M^4$ provided for the purpose of causing the shaft K to rock and throw the brushes $K^4$ into the paint or shellac receptacle J and afterward hold the heads of the brushes against the spool as the same is rotated. Another rock shaft, designated in the drawings by letter O, is mounted in suitable bearings upon the frame of the apparatus and has a crank arm O' fixed thereto, which in turn has slotted pivotal connection with a crank arm $O^2$ and which in turn is fixed to the rock shaft $O^3$ by means of a set screw $O^4$. An angled arm $O^5$ is held by means of a set screw $O^6$ to the shaft $O^3$ and carries an anti-friction roller $O^7$, shown in Fig. 3 of the drawings, and which is adapted to contact with the edge of the cam Q, a detail of which is shown in Fig. 5 of the drawings, and which is held by means of a set screw Q' upon the shaft A'. A coiled spring R is fastened at one end to the lever angled arm L and its other end to the angled arm $O^5$, and serves as means for normally holding the two arms at their limits toward each other. Fixed to the shaft $O^3$ is a series of collars S which are similar to the collars K and which collar S is held by means of a set screw $S^2$ in adjusted positions upon the shaft O. Brushes $S^3$ having handles $S^4$ are held by means of the eye bolts $S^5$.

The operation of my apparatus will be fully understood and is as follows: The spool to be shellacked or painted is placed upon the rack and one end engaged by the four-cornered center of the lathe, while its opposite end is engaged by the tail stock of the lathe. A rotary movement may be imparted to the spool by belted connections, not shown, with the pulley $C^2$ and a rotary movement imparted to the shaft A' by belted connections, not shown, with the pulleys $B^3$. As the cam M which is fixed to the shaft A' rotates therewith, the edge of said shaft coming in contact with the anti-friction roller L' will cause the arm L to rock the shaft $K^{13}$, which in turn will cause the shaft K to rock through the crank arms $K^7$ and $K^{12}$, thus causing the series of brushes $K^4$ to dip into the receptacle J for a supply of shellac or paint, the brushes being thrown into said receptacle while the scalloped portions of the cam $M^2$ are in contact with the anti-friction wheel L' and raised and returned against the rotating spool when the projecting portions of the cam cause the arms L to be thrown to the position shown in Fig. 3 of the drawings. As the cam Q rotates it will throw the arm $O^5$ and cause the brushes $S^2$, through the medium of the connection shown, to bear against the spool to cause the shellac or paint to be evenly distributed.

It will be noted that the cam Q is so mounted upon the shaft A' with which it turns that, when the eccentric part comes in contact with the end of the arm $O^5$, the latter will be tilted and the brushes will, for a moment, be against the circumference of the spool while spreading of the shellac or paint upon the surface thereof. It will be understood that the brushes $S^3$ are not to be dipped into the receptacle but are for the purpose of spreading and causing the coating of the spools to be evenly distributed. At each revolution of the shaft A' the cam edge F coming in contact with the anti-friction roller E will cause the roller $E^4$ to oscillate and detach the spool which has been painted or shellacked.

By the provision of the apparatus shown and described, it will be noted that simple and efficient mechanism is afforded whereby spools may be automatically shellacked or painted in rapid succession adapting the same for use for cotton milling machinery.

What I claim to be new is:—

1. An apparatus for painting and shellacking spools, etc., comprising a frame, a rotatable shaft journaled therein, a lathe spindle and tail stock for holding and causing a spool to rotate, a cam fixed to said rotatable shaft, a lever pivotally mounted upon the frame, an anti-friction roller journaled upon said lever and contacting with said cam, the said lever having pivotal connection with the shank of said tail stock and affording means for withdrawing the tail stock from a spool, a spring fastened to said lever for returning the same to its normal position, a rock shaft, collars fixed to the latter, brushes fastened to the collars, a paint containing receptacle adjacent to the rock shaft, a crank upon the latter, a cam fixed to the rotatable shaft, and means actuated by said cam and adapted to actuate the rock shaft, as set forth.

2. An apparatus for painting and shellacking spools, etc., comprising a frame, a rotatable shaft journaled therein, a lathe spindle and tail stock for holding and causing a spool to rotate, a cam fixed to said rotatable shaft, a lever pivotally mounted upon the frame, an anti-friction roller journaled upon said lever and contacting with said cam, the said lever having pivotal connection with the shank of said tail stock and affording means for withdrawing the tail stock from a spool, a spring fastened to said lever for returning the same to its normal position, rock shafts journaled in the frame, cams fixed to the rotatable shaft, collars fixed to said rock shafts, brushes carried by the collars, cranks fastened to each rock shaft, stub shafts, a crank arm fastened to each stub shaft and having pivotal connection each with a crank upon said rock shaft, and angle arms fastened to said stub shafts and adapted to contact with different cams upon said rotatable shaft, as set forth.

3. An apparatus for painting and shellacking spools, etc., comprising a frame, a rotatable shaft journaled therein, a lathe spindle and tail stock for holding and causing a spool to rotate, a cam fixed to said rotatable shaft, a lever pivotally mounted upon the frame, an anti-friction roller journaled upon said lever and contacting with said cam, the said lever having pivotal connection with the shank of said tail stock and affording means for withdrawing the tail stock from a spool, a spring fastened to said lever for returning the same to its normal position, rock shafts journaled in the frame, cranks fastened to each rock shaft, stub shafts, a crank arm fastened to each stub shaft and having pivotal connection with a crank upon said rock shaft, angled arms fastened one to each of said stub shafts, and an anti-friction roller journaled upon each end of an angle arm and each adapted to contact with a cam upon a rotatable shaft, as set forth.

4. An apparatus for painting and shellacking spools, etc., comprising a frame, a rotatable shaft journaled therein, a lathe spindle and tail stock for holding and causing a spool to rotate, a cam fixed to said rotatable shaft, a lever pivotally mounted upon the frame, an anti-friction roller journaled upon said lever and contacting with said cam, the said lever having pivotal connection with the shank of said tail stock and affording means for withdrawing the tail stock from a spool, a spring fastened to said lever for returning the same to its normal position, rock shafts journaled in the frame, crank arms having adjustable pivotal connections with said rock shaft, stub shafts to which said crank arms are fastened, angled arms fastened one to each of said stub shafts, an anti-friction roller journaled upon each end of an angle arm and each adapted to contact with a cam upon a rotatable shaft, and a bracket arm mounted upon the frame and a spool holder carried by said bracket arm, as set forth.

5. An apparatus for painting and shellacking spools, etc., comprising a frame, a rotatable shaft journaled therein, a lathe spindle and tail stock for holding and causing a spool to rotate, a cam fixed to said rotatable shaft, a lever pivotally mounted upon the frame, an anti-friction roller journaled upon said lever and contacting with said cam, the said lever having pivotal connection with the shank of said tail stock and affording means for withdrawing the tail stock from a spool, a spring fastened to said lever for returning the same to its normal position, rock shafts journaled in the frame, cams fixed to the rotatable shaft, collars fixed to said rock shafts, brushes carried by said collars, other cams fixed to the rotatable shaft, a paint containing receptacle adjacent to the rock shaft, and means actuated by said other cams for causing one of the shafts to rock to cause the brushes thereon to dip into said paint receiving receptacle and the other to cause the brushes upon the other shaft to spread the paint upon the spool, as set forth.

In testimony whereof I hereunto affix my signature in the presence of two witnesses.

JOHN EDWARD LOCK.

Witnesses:
C. E. HYNDMAN,
ALEXINA JONCAS.

Copies of this patent may be obtained for five cents each, by addressing the "Commissioner of Patents, Washington, D. C."